(12) United States Patent
Andresen et al.

(10) Patent No.: US 8,823,191 B2
(45) Date of Patent: Sep. 2, 2014

(54) METHOD AND ARRANGEMENT FOR CONTROLLING A WIND TURBINE USING OSCILLATION DETECTION

(71) Applicants: Björn Andresen, Ostbirk (DK); Nikolaus Moeller Goldenbaum, Silkeborg (DK); Bo Yin, Brande (DK)

(72) Inventors: Björn Andresen, Ostbirk (DK); Nikolaus Moeller Goldenbaum, Silkeborg (DK); Bo Yin, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/756,624

(22) Filed: Feb. 1, 2013

(65) Prior Publication Data
US 2013/0200621 A1 Aug. 8, 2013

(30) Foreign Application Priority Data
Feb. 8, 2012 (EP) .................................... 12154476

(51) Int. Cl.
*F03D 7/00* (2006.01)

(52) U.S. Cl.
USPC ........................................... 290/44; 700/287

(58) Field of Classification Search
CPC ..... Y02E 10/723; Y02E 10/763; F03D 7/0284
USPC ......................................... 290/44, 7; 700/287
See application file for complete search history.

(56) References Cited

U.S. PATENT DOCUMENTS

| | | | |
|---|---|---|---|
| 4,994,684 A * | 2/1991 | Lauw et al. | 290/52 |
| 7,173,399 B2 * | 2/2007 | Sihler et al. | 322/40 |
| 8,068,352 B2 * | 11/2011 | Yu et al. | 363/17 |
| 8,310,074 B2 * | 11/2012 | Larsen et al. | 290/44 |
| 8,659,178 B2 * | 2/2014 | Arlaban Gabeiras et al. | 290/44 |
| 2011/0074152 A1 | 3/2011 | Yasugi | |
| 2011/0089693 A1 * | 4/2011 | Nasiri | 290/44 |
| 2011/0309804 A1 | 12/2011 | Yasugi | |
| 2012/0013376 A1 * | 1/2012 | Thacker et al. | 327/156 |

FOREIGN PATENT DOCUMENTS

EP 2075463 A2 7/2009

* cited by examiner

*Primary Examiner* — Michael Zarroli

(57) ABSTRACT

A method for controlling a wind turbine is provided. The method includes monitoring an electrical quantity at an output terminal of the wind turbine. The electric quantity has an amplitude and periodically varying with a grid frequency. The method further includes detecting an oscillation of the amplitude and decreasing active power output from the wind turbine at the output terminal depending on the detected oscillation.

17 Claims, 4 Drawing Sheets

METHOD AND ARRANGEMENT FOR CONTROLLING A WIND TURBINE USING OSCILLATION DETECTION

FIELD OF INVENTION

The illustrated embodiments relate to a method and to an arrangement for controlling (in particular a converter of) a wind turbine, in particular, based on detection of an oscillation of an electrical quantity at an output terminal of the wind turbine.

BACKGROUND OF INVENTION

One or more wind turbines may be connected to a point of common coupling (PCC) which in turn is connected to a utility grid to provide electric energy to plural consumers.

Normally, the short circuit capacity at the point of common coupling is used to determine the strength of grid. When wind farm is located close to the main generation units where the short circuit capacity is high, it is said that wind farm is connected to a strong grid. However, in some situations, the wind farm is located far from the main generation units the short circuit capacity is low, it is said that wind farm is connected to a weak grid. In other situations, a strong grid is changed into a weak grid due to fault, for example, trap of transmission lines.

It has been observed that with a conventional method and arrangement in a wind turbine controller, it might not be able to obtain similar or stable responses at least of some electrical properties for both weak and strong grid.

There may be a need for a method and arrangement for operating a wind turbine in both strong grid and weak grid, especially in a weak grid which is connected to a utility grid, wherein electrical requirements, in particular at the wind turbine and/or at point of common coupling, are satisfied. Further, there may be a need for a method and an arrangement for controlling a wind turbine, in particular for adjusting an output voltage of the wind turbine to a reference value.

SUMMARY OF INVENTION

This need may be met by the subject matter according to the independent claims Advantageous embodiments are described by the dependent claims.

According to an embodiment, it is provided a method for controlling (in particular a converter of) a wind turbine, the method comprising: monitoring an electrical quantity at an output terminal of the (converter of the) wind turbine, the electric quantity having an amplitude and periodically varying with a grid frequency (such as 50 Hz or 60 Hz); detecting an oscillation of the amplitude; decreasing or curtailing active power output from the wind turbine at the output terminal depending on the detected oscillation.

The method may be performed by the wind turbine, in particular a controller of the wind turbine, and/or may be performed by a wind park controller, such as a park pilot. The park pilot may send a command to the wind turbine, in particular a converter of the wind turbine, for decreasing the active power output from the wind turbine. The command may include a reference active power which is decreased, in particular relative to a nominal active power reference.

In particular, the park pilot may control plural wind turbines comprised in a wind farm according to the described method.

Controlling the wind turbine may comprise controlling one or more components of the wind turbine. In particular, a converter of the wind turbine can be controlled regarding its output of active power, reactive power, current and/or voltage at the output terminal of the wind turbine. Further, the wind turbine may be controlled regarding mechanical components, such as pitch angle of rotor blades. Further, a rotational speed of a rotor, to which one or more rotor blades are connected, may be controlled by controlling a torque exerted by a generator of the wind turbine on the rotation shaft. In particular, the torque exerted by the generator may be controlled by controlling a portion of the converter of the wind turbine, in particular a AC-DC portion of the converter of the wind turbine.

Monitoring the electrical quantity may comprise obtaining one or more signals from one or more measurement sensors, which measure the electrical quantity. The electrical quantity may in particular be measured directly at the output terminal of the wind turbine or may be measured at a location remote or spaced apart from the output terminal of the wind turbine. For example, the electrical quantity may be measured also at a point of common coupling, to which a number of wind turbines may be connected to supply electrical energy to a utility grid, which has a particular grid frequency. The electrical properties directly at the output terminal of the wind turbine may then be derived based on the electrical quantity measured or sensed remote from the output terminal of the wind turbine.

The electrical quantity varies periodically with the grid frequency, such as 50 Hz or 60 Hz. Thereby, the electrical quantity has an amplitude, which my represent a factor with which a sine or cosine function is multiplied. Under normal operation conditions the amplitude of the electrical quantity should be constant, in particular constant and equal to a nominal value (or close to nominal value) of the electrical quantity. The nominal value may also be referred to as 1 per unit (1 pu). In particular, upon occurrence of a distortion in the grid, for example due to transmission line fault or other failures, an oscillation of the amplitude of the electrical quantity may be excited. The occurrence of such an oscillation of the amplitude of the electrical quantity may lead in particular to an electrical quantity at the output terminal of the wind turbine, which deviates from an intended or reference electrical quantity. The excitation of the oscillation of the amplitude of the electrical quantity may in particular be observed for a weak grid being a grid having particularly high impedance.

The detecting the oscillation of the amplitude may comprise measuring the amplitude of the electrical quantity in dependence of time, thus measuring a time course of the amplitude. In particular, the oscillation of the amplitude is a variation of the amplitude with time. The oscillation of the amplitude may be periodic. In particular, a frequency of the oscillation of the amplitude may be by a factor between five times and one hundred times, in particular between ten times and fifty times, smaller than the grid frequency.

The detecting the oscillation of the amplitude may comprise measuring plural samples of the electrical quantity at plural subsequent time points, such as between 10 and 500 time points, in particular between 50 and 200 time points, which may be spaced apart between 0.01 s and 1 s.

The decreasing the active power output from the output terminal may involve supplying a control signal to the converter of the wind turbine, in particular a active power reference signal, involving supply (or generation by the converter) of pulse width modulation signals. If there is no oscillation detected, the active power output may be maintained, in particular at a specific active power output depending on wind speed or available wind power.

Decreasing the active power output may result in a damping of the oscillation of the amplitude, comprising reducing a magnitude of the oscillation of the amplitude. In particular, when the oscillation ceases, the active power output may be increased again, in particular to a specific value depending on wind speed or available wind power.

According to an embodiment, the decreasing the active power output comprises decreasing the active power output, in particular from a present generated active power output, by between 100% and above 0% (in particular between 40% and above 10%) of the generated active power output, in particular in (one or more) step(s) of between 10% and 0% of the generated active power output, until oscillation disappears, in particular for a time span between 0.02 s and 30 s.

Thus, the active power output may be decreased by between 0% and 100%, in particular in a step of 5% of the generated active power output until oscillation disappears.

According to an embodiment, the decreasing the active power output comprises decreasing the active power output, in particular from a present generated active power output, by between 100% of generated active power. and 0 p.u. of the nominal power, in particular in a step of between 0.1 p.u. and 0.05 p.u. of the nominal active power output until oscillation disappears, in particular for a time span between 0.02 s and 30 s.

Thus, the active power output may be decreased by between 0% and 100% of the generated active power output, in particular in a step of 0.05 p.u. of the nominal active power output until oscillation disappears.

Thereby, as an effect, the oscillation of the amplitude may cease such that the amplitude of the electrical quantity may be brought by to a constant value.

According to an embodiment, the detecting the oscillation of the amplitude comprises detecting a frequency of the oscillation of the amplitude in a frequency range between 0.5 Hz and 10 Hz, in particular between 1.8 Hz and 2.2 Hz, in particular between 3.8 Hz and 4.2 Hz.

In particular, if the electrical quantity is or comprises the voltage, or the reactive power or the active power at the output terminal of the wind turbine, the frequency range may be between 2.2 Hz and 1.8 Hz, in particular about 2 Hz. Further, in particular, if the electrical quantity is a reactive current output at the output terminal of the wind turbine, the frequency range may be between 3.8 Hz and 4.2 Hz, in particular around 4 Hz.

Thereby, effective reduction or damping of the oscillation of the amplitude may be achieved.

According to an embodiment, monitoring the electrical quantity comprises monitoring, in particular measuring, a voltage at the output terminal and/or monitoring, in particular measuring, a current and/or a reactive power and/or an active power output from the output terminal.

Alternatively, the voltage, the current and/or the reactive power and/or the active power may be measured at a location remote from the output terminal of the wind turbine, such as close to or at a point of common coupling. The electrical condition at the output terminal may then be derived based on the measurement performed remote from the output terminal. Thereby, monitoring the electrical quantity may be simplified.

According to an embodiment, the decreasing the active power output from the output terminal comprises decreasing the active power output by an amount which depends on a magnitude of the detected oscillation of the amplitude, wherein in particular the amount increases with increasing magnitude.

If the magnitude of the detected oscillation of the amplitude is zero, then the amplitude of the electrical quantity may be constant with time. In contrast, when the magnitude of the detected oscillation of the amplitude is larger than zero, then the amplitude may oscillate between a maximal amplitude and a minimal amplitude. In particular, the oscillation may be according to a trigonometric function, such as a sine function or a cosine function. According to other embodiments, the oscillation of the amplitude may be according to a superposition of a number of sine and/or cosine functions. According to still other embodiments, the oscillation of the amplitude may be non-periodic.

According to an embodiment, the decreasing the active power output from the wind turbine comprises supplying control signals (involving pulse width modulation signals) to a converter, in particular AC-DC-AC converter, of the wind turbine, wherein the converter is connected between a generator of the wind turbine and a wind turbine transformer, the output terminal of the wind turbine being an output terminal of the converter at the transformer side.

The converter may in particular comprise a AC-DC converter portion, a DC link and a DC-AC converter portion. The AC-DC converter portion and also the DC-AC converter portion may comprise in particular a number of controllable switches, such as isolated gate bipolar transistors (IGBTs), wherein in particular per phase two IGBTs are provided in each converter portion, thus for three phases six IGBTs per converter portion. The controllable switches may be controlled by pulse width modulation signals in order on the one hand (using the AC-DC converter portion) to control a torque acting on the rotation shaft, and on the other hand (using the DC-AC converter portion) to control the power output stream regarding voltage, current, active power, reactive power.

In particular, the method may be aimed at controlling the output voltage at the output terminal of the wind turbine to be at a reference output voltage.

The wind turbine may be a full scale converter type wind turbine or may be a doubly fed converter type wind turbine having a doubly fed induction generator (DFIG). Accordingly, the generator and the converter may be appropriately configured. In DFIG, the stator of the generator is connected to the grid. The frequency converter controls the generator through the rotor. In a full scale converter, the stator of generator is connected to frequency converter. The generator and grid is decoupled by frequency converter.

By providing the converter between the generator and the wind turbine transformer, the power output stream output at the output terminal of the wind turbine may be controlled by supplying appropriate control signals, in particular based on which pulse width modulation signals are derivable, to the converter, thereby simplifying the control method.

According to an embodiment, a deviation between a voltage measured at the output terminal and a reference voltage is supplied to a PI-controller which outputs a reference value, in particular voltage reference value or reactive current reference value reference or reactive power reference, which reference value is supplied to the converter (based on which reference value pulse width modulation signals are derivable according to which the controllable switches are fired), wherein the PI-controller is defined by an proportional gain coefficient and a integral gain coefficient, wherein the proportional gain coefficient and/or the integral gain coefficient are changed depending on the detected oscillation, are in particular increased with increasing magnitude of the oscillation until a predefined maximum value is reached.

The proportional gain coefficient and/or the integral gain coefficient may be increased in a stepwise manner upon detection of the oscillation of the amplitude of the electrical quantity. In particular, the gain coefficients may be increased with increasing magnitude of the oscillation.

According to an embodiment, the control method further comprises disconnecting the output terminal from a utility grid, if the oscillation of the amplitude is still detected after having decreased the active power output from the output terminal for a predetermined time span, in particular ranging between 2 s and 30 s, in particular between 5 s and 15 s.

Therefore, a switch may be provided between for example the converter of the wind turbine and the wind turbine transformer. Alternatively, a switch may be provided between the wind turbine transformer and the point of common coupling. By disconnecting the wind turbine from the grid (using the switch), damage of components of the wind turbine may be avoided.

The predetermined time span may depend on the constitution of components of the wind turbine, for example.

According to an embodiment, the control method further comprises increasing the active power, in particular to the specific active power output, output from the output terminal after having decreased the active power output from the output terminal, if the oscillation is not detected anymore.

Thereby, the wind turbine may again supply the full active power obtained from wind energy to the grid, in order to avoid waste of energy. Thereby, the efficiency of the wind turbine may be improved.

It should be understood that features individually or in any combination disclosed, described, mentioned, explained or employed for a method for controlling a wind turbine, may also be applied (individually or in any combination) to an arrangement for controlling a wind turbine according to an embodiment and vice-versa.

According to an embodiment, it is provided an arrangement for controlling, in particular a converter of, a wind turbine, the arrangement comprising: a sensor adapted to monitor an electrical quantity at an output terminal of the (converter of the) wind turbine, the electric quantity having an amplitude and periodically varying with a grid frequency; a detector adapted to detect an oscillation of the amplitude; a controller adapted to generate control signals for decreasing active power output from the output terminal depending on the detected oscillation.

The arrangement may be part of the wind turbine (thus associated with the wind turbine) and/or part of wind park controller.

The detector and/or the controller may be comprised in a wind turbine controller and measurement signals may be supplied from the sensor to the detector and/or the controller.

BRIEF DESCRIPTION OF THE DRAWINGS

Embodiments are now described with reference to the accompanying drawings. The invention is not limited to the described or illustrated embodiments.

The aspects defined above and further aspects are apparent from the examples of embodiment to be described hereinafter and are explained with reference to the examples of embodiment. Embodiments will be described in more detail hereinafter with reference to examples of embodiment but to which the invention is not limited.

DETAILED DESCRIPTION OF INVENTION

Figure 1:
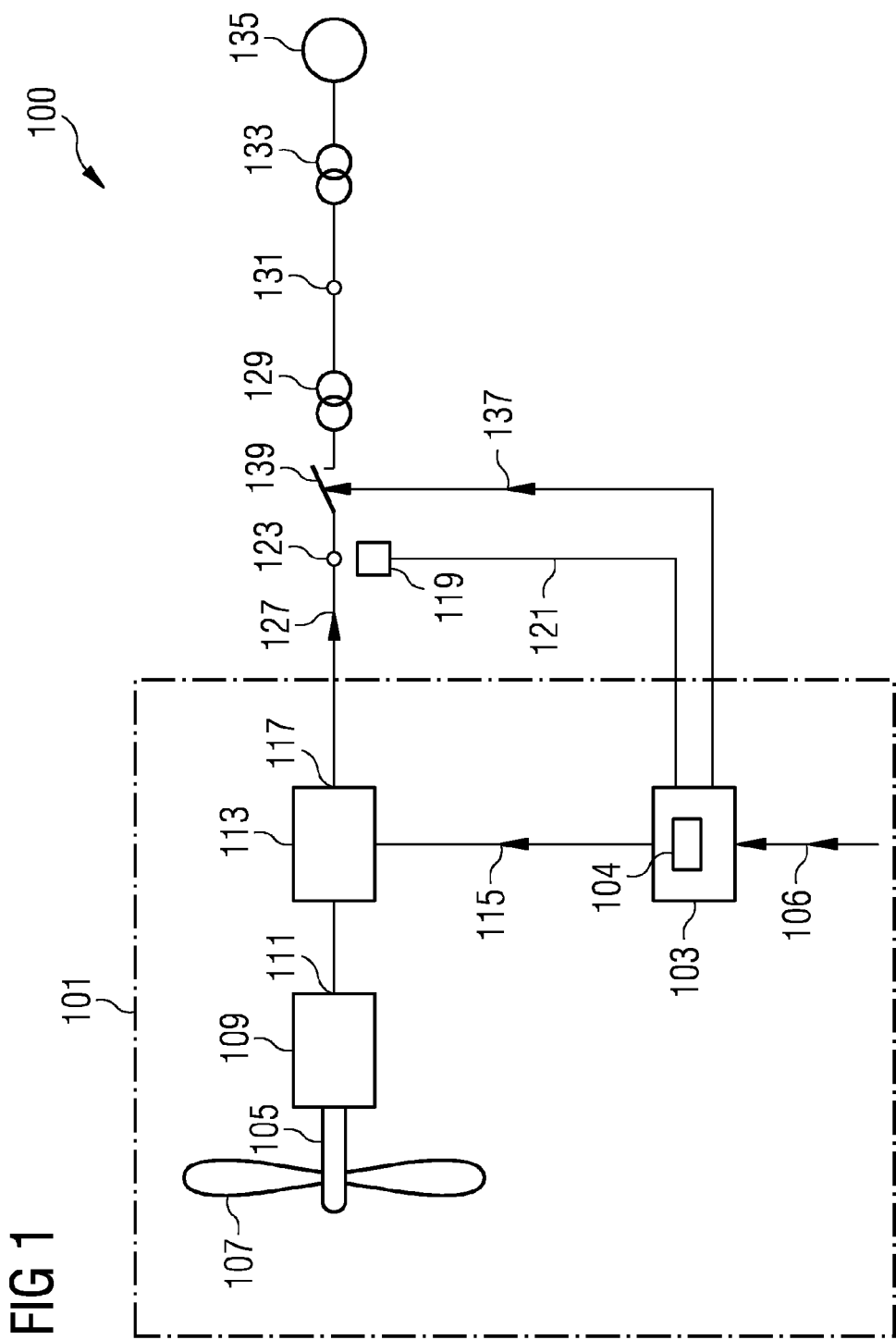
FIG. 1 schematically illustrates a portion or an energy production facility comprising a wind turbine having an arrangement according to an embodiment performing a method according to an embodiment.

FIG. 1 schematically illustrates a portion 100 of an energy production facility comprising a wind turbine 101 having an arrangement 103 for controlling the wind turbine 101 according to an embodiment, wherein the arrangement 103 performs a method for controlling the wind turbine 101 according to an embodiment.

The wind turbine 101 comprises a rotation shaft 105 at which one or more rotor blades 107 are connected. The rotation shaft 105 is mechanically coupled to a generator 109, which generates at a terminal 111 an AC power stream upon rotation of the rotation shaft 105, wherein the power stream is supplied to a AC-DC-AC converter 113. The converter 113 is supplied with a reference voltage or reference current or reference active power or reference reactive power 115 from the arrangement 103 and outputs at an output terminal 117 (corresponding also to an output terminal of the wind turbine 101) a power stream 127.

A sensor 119 measures an electrical quantity 121 (voltage V, current I, active power P and/or reactive power Q) at a location 123 close to the output terminal 117 of the wind turbine 101 and supplies corresponding measurement signals 121 to the arrangement 103, which receives the measurement signals at an input terminal 125 and a reference value 106 e.g. from a park pilot. Based on the reference value 106 and the measurement signals indicative of the electrical quantity (in particular voltage V, active power P, reactive power Q or current I) at the location 123, the arrangement 103 detects, whether the electrical quantity 121 has an amplitude and varies periodically with a grid frequency, wherein it is detected, whether the amplitude oscillates. Depending on the detected oscillation of the amplitude, the arrangement 103 derives the reference value 115 (using a PI-controller 104), in particular reference voltage, which is supplied to the converter 113.

The power output stream 127 output at the output terminal 117 is further supplied to a wind turbine transformer 129, which transforms the output voltage to a higher voltage at a point of common coupling 131. From there, the power stream 127 is transmitted via a transmission line, in particular via a park transformer 133 to a utility grid 135, which supplies the electric energy to plural consumers.

The arrangement 103 may also supply a control signal 137 to a switch 139, which upon opening disconnects the wind turbine 101 from the utility grid 135, in order to protect the wind turbine from damage during malfunction or failures in the grid or in the transmission line.

The impedance of the grid may be denoted as Zgrid and the impedance of the wind turbine together with the wind turbine transformer 129 may be denoted as ZWTT.

The sensor 119 may be a sensor measuring a voltage V, measuring an active power P and/or measuring a reactive power Q at the location 123 close to the output terminal 117 of the wind turbine 101.

Figure 2:
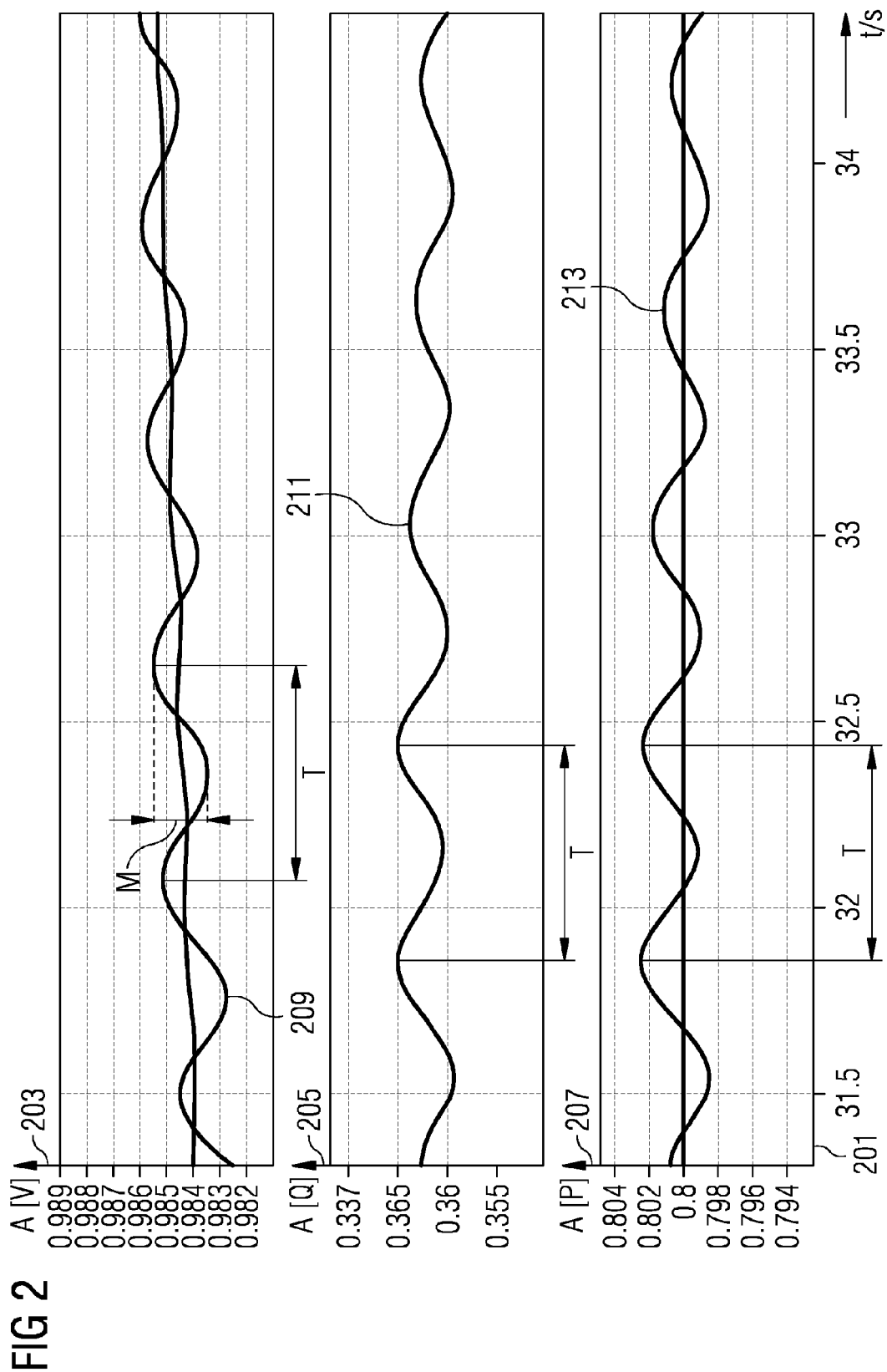
FIG. 2 illustrates graphs considered during a method for controlling a wind turbine according to an embodiment.

FIG. 2 illustrates three graphs, wherein an abscissa 201 denotes the time in seconds and ordinates 203, 205, 207 denote an amplitude A(V) of a voltage, an amplitude A(Q) of a reactive power Q and an amplitude A(P) of a active power P at the output terminal 117 of the wind turbine 101, wherein the amplitude is denoted per unit, i.e. in a fraction of respective nominal values.

The curve 209 denotes the amplitude A(V) of the voltage at the output terminal 117, the curve 211 denotes the amplitude A(Q) of the reactive power Q at the output terminal 117 of the wind turbine 101 and the curve 213 depicts the amplitude A(P) of the active power P at the output terminal 117 of the wind turbine 101. As can be seen from FIG. 2, all these three electrical quantities have an amplitude that oscillates with a magnitude M periodically with a period T, which amounts to about 0.6 s. Thus, the frequency of the oscillation of the amplitude illustrated in FIG. 2, is about 1.6 Hz.

The oscillation of the amplitude of the electrical quantities V and Q and P may be due to or may have been excited by a grid fault in a grid with a relatively high impedance. Thereby, an oscillation may be excited having the frequency of 1.6 Hz. The oscillation is detected by the arrangement 103 in a method according to embodiments.

Figure 3:
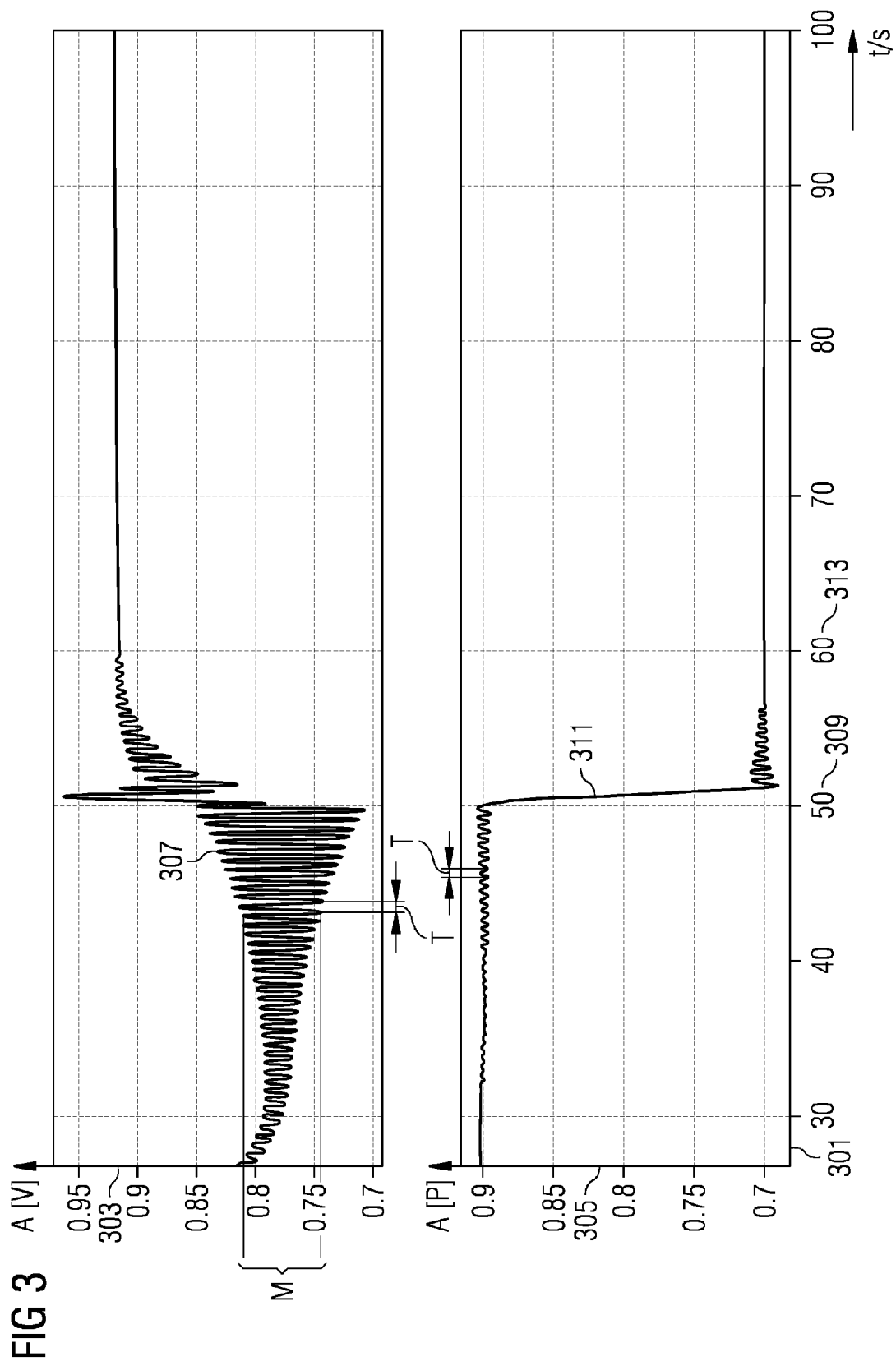
FIG. 3 illustrates graphs illustrating a method step in a method according to an embodiment.

FIG. 3 illustrates two graphs, wherein on an abscissa 301 the time in seconds is indicated, while on ordinates 303 and 305 the amplitude A(V) of the voltage at the output terminal 117 of the wind turbine 101 is indicated and the amplitude A(P) of the active power P at the output terminal 117 of the wind turbine 101 are indicated, respectively.

Thereby, in FIG. 3, the scale on the time axis, i.e. the abscissa 301, is different from the scale on the time axis, i.e. the abscissa 201 in FIG. 2.

As is indicated by the curve 307, the amplitude A(V) of the voltage V at the output terminal 117 periodically oscillates with the period T as illustrated also in the upper graph of FIG. 2.

Further, as also indicated in the graphs depicted in FIG. 2, the amplitudes in FIG. 3 are also denoted as fractions of nominal values.

As is apparent from the upper graph in FIG. 3, the amplitude A(V) oscillates with the period T in the time range from about 25 s to 50 s, whereby the amplitude varies between about 0.75 pu and 0.85 pu, whereas the magnitude of the oscillation of the amplitude increases up to the time point 309 at about 50 s.

As is indicated in the lower graph in FIG. 3, the amplitude A(P) of the active power P (curve 311) also oscillates in the time range from about 25 s to 50 s with a period T around a value of about 0.9 pu. At the time point 309 (at around 50 s) the arrangement 103 supplies an altered reference value 115 to the converter 113, which causes the converter 113 to output a reduced active power P, as is apparent from the drop of the curve 311 shortly after the time point 309. In particular, the active power output P drops from about 0.9 pu to about 0.7 pu. The value 0.7 pu is thereby reached at about 55 s or 60 s at a time point 313 and stays then substantially constant at the value 0.7 pu.

Further, due to the reduction of the active power P output from the wind turbine 101, the amplitude A(V) of the voltage V and the output terminal 117 of the wind turbine 101 increases from a value of around 0.75 to a value of about 0.9 pu at the time point 313, i.e. about 10 s after the supply of the altered reference value 115 to the converter 113 causing the converter 113 to reduce the active power output P. Additionally, beyond the time point 313, the amplitude A(V) of the voltage V at the output terminal 117 stays substantially constant without showing any oscillations anymore. Thus, the stability of the voltage at the output terminal has been achieved by reducing the active power output P.

Figure 4:
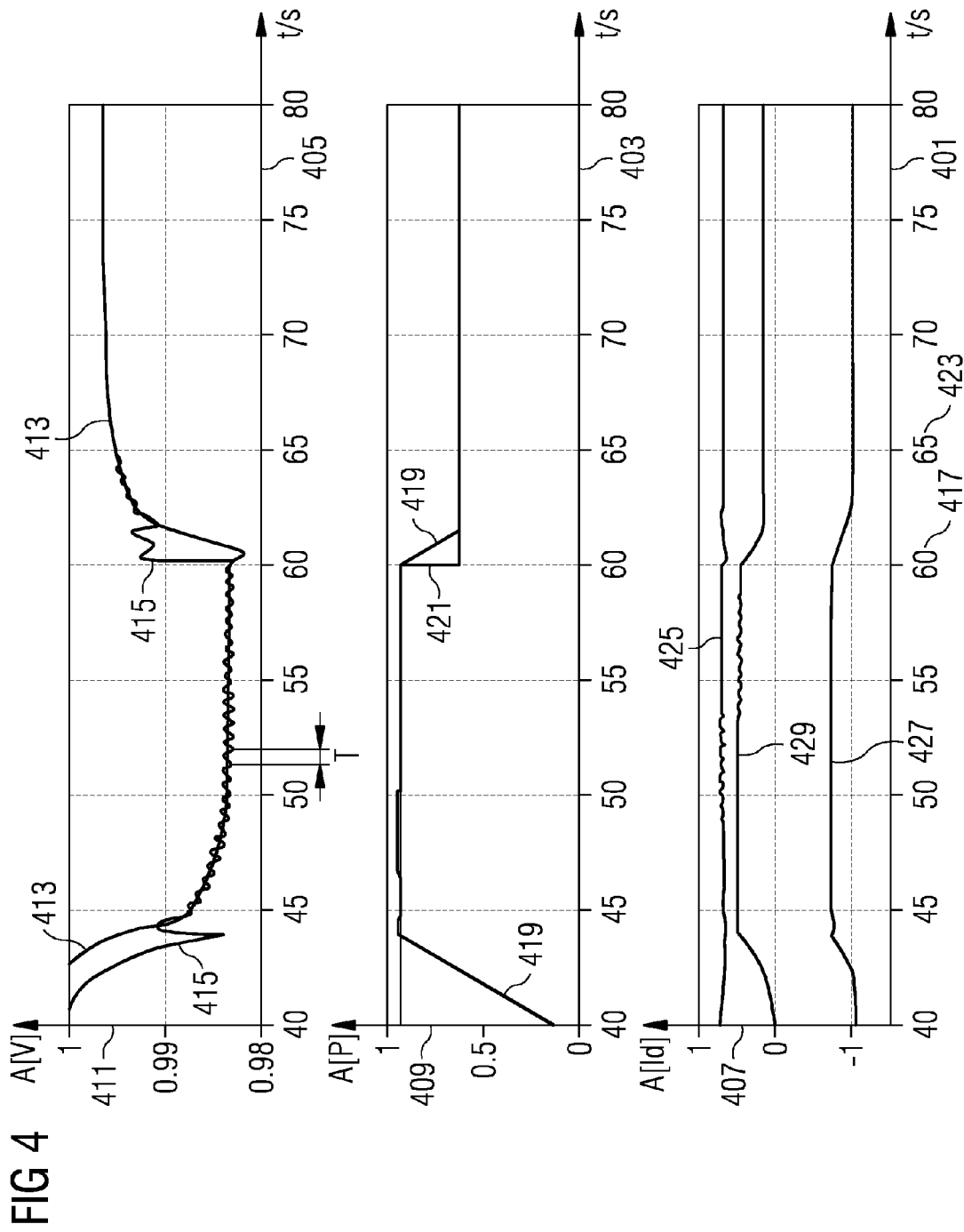
FIG. 4 illustrates graphs sketching values of electrical quantities measured or adjusted according to a method according to an embodiment.

FIG. 4 schematically illustrates another example of a control method, which may be performed by the arrangement 103 illustrated in FIG. 1 according to an embodiment.

On abscissas 401, 403 and 405, the time in seconds is indicated. On the ordinates 407, 409 and 411 the amplitude A(Id) of the reactive current, the amplitude A(P) of the active power P and the amplitude A(V) of the voltage V at the output terminal 117 are indicated, again in units of nominal values.

The reference value (which may be related or may equal the control signal 115 output from the arrangement 103 to control the converter 113) of the amplitude of the voltage is indicated as a curve 413 and the actually measured amplitude of the voltage is denoted as a curve 415. As can be seen, the measured voltage or measured amplitude of the voltage 415 oscillates with a period of about half a second.

The reference value of the active power is denoted as a curve 421 (which may be related or may be equal to the control signal 115 output from the arrangement 103 to control the converter 113). At a time point 417 (about 60 s), the amplitude A(P) of the active power P is reduced (by the arrangement 103 in FIG. 1) from a value of about 0.9 to a value of about 0.7 as indicated by the reference curve 421.

Further, the measured amplitude of the active power (curve 419) drops. As a result, the amplitude A(V) as measured (curve 415) increases from a value of about 0.983 to a value of about 0.995 at and beyond a time point 423.

The lower graph in FIG. 4 depicts the reactive current (maximal reactive current as curve 425, minimal reactive current as curve 427 and actually measured reactive current as curve 429). As is apparent from curve 429 in FIG. 4, the reactive current drops at the time point 417 (at which the reactive power is reduced according to curve 421) from a value of about 0.5 to a value of about 0.1 pu.

Thus, the measured amplitude A(V) (curve 415) of the voltage at the output terminal 117 after reducing the amplitude of the active power output P, stay constant close to the value 1 pu, indicating that a stabilization of the output voltage is achieved.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method for controlling a wind turbine, the method comprising:
    monitoring an electrical quantity at an output terminal of the wind turbine, the electric quantity having an amplitude and periodically varying with a grid frequency;
    detecting an oscillation of the amplitude;
    decreasing an active power output from the wind turbine at the output terminal depending on the detected oscillation,
    supplying a deviation between a voltage measured at the output terminal and a reference voltage to a PI-controller which outputs a reference value, which reference value is supplied to the converter,
    wherein the PI-controller is defined by an proportional gain coefficient and a integral gain coefficient, wherein the proportional gain coefficient and/or the integral gain coefficient are changed depending on the detected oscillation.

2. The method according to claim 1, wherein said reference value is a voltage reference value or reactive current reference value or reactive power reference.

3. The method according to claim 1, wherein the proportional gain coefficient and/or the integral gain coefficient are increased with increasing magnitude of the oscillation until a pre-defined maximum is reached.

4. The method according to claim 1, further comprising:
disconnecting the output terminal from a utility grid, if the oscillation of the amplitude is still detected after having decreased the active power output from wind turbine for a predetermined time span.

5. The method according to claim 1, further comprising:
disconnecting the output terminal from a utility grid, if the oscillation of the amplitude is still detected after the active power output being decreased to a minimum allowed value.

6. The method according to claim 1, further comprising:
increasing the active power output from the output terminal after having decreased the active power output from the output terminal, if the oscillation is not detected anymore.

7. The method according to claim 6, wherein said active power is increased to the possible maximum active power output depending on available wind power resource or wind speed.

8. The method according to claim 1, wherein the grid frequency is 50 Hz or 60 Hz.

9. The method according to claim 1, wherein the decreasing the active power output comprises decreasing the active power until oscillation disappears.

10. The method according to claim 9, wherein the active power output is the present generated active power output.

11. The method according to claim 10, wherein the present generated active power output is decreased in one or more step(s) of between 10% and 0% of the generated active power output.

12. The method according to claim 1, wherein the detecting the oscillation of the amplitude comprises detecting a frequency of the oscillation of the amplitude in a frequency range between 0.5 Hz and 10 Hz.

13. The method according to claim 1, wherein monitoring the electrical quantity comprises monitoring a voltage at the output terminal and/or monitoring a current and/or a reactive power and/or an active power output from the output terminal.

14. The method according to claim 1, wherein the decreasing the active power output from the wind turbine comprises decreasing the active power output by an amount which depends on a magnitude of the detected oscillation of the amplitude.

15. The method according to claim 14, wherein said amount increases with increasing magnitude.

16. The method according to claim 1, wherein the decreasing the active power output from the wind turbine comprises supplying pulse width modulation signals to at least one controllable switch of a converter of the wind turbine, wherein the converter is connected between a generator of the wind turbine and a wind turbine transformer, the output terminal of the wind turbine being an output terminal of the converter at the transformer side.

17. The method according to claim 1, wherein the converter is a AC-DC-AC converter.

* * * * *